(12) United States Patent
Williams et al.

(10) Patent No.: US 9,873,359 B2
(45) Date of Patent: Jan. 23, 2018

(54) CHILD SAFETY SEAT

(71) Applicant: Wonderland Nurserygoods Company Limited, Kwai Chung, N.T. (HK)

(72) Inventors: Bruce L. Williams, Narvon, PA (US); Gregory S. Sellers, Christiana, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 60 days.

(21) Appl. No.: 14/965,129

(22) Filed: Dec. 10, 2015

(65) Prior Publication Data

US 2016/0176320 A1 Jun. 23, 2016

Related U.S. Application Data

(60) Provisional application No. 62/124,607, filed on Dec. 23, 2014, provisional application No. 62/243,922, filed on Oct. 20, 2015.

(51) Int. Cl.
*B60N 2/28* (2006.01)
*B60N 2/26* (2006.01)

(52) U.S. Cl.
CPC ......... *B60N 2/2875* (2013.01); *B60N 2/2821* (2013.01); *B60N 2/2872* (2013.01)

(58) Field of Classification Search
None
See application file for complete search history.

(56) References Cited

U.S. PATENT DOCUMENTS

| 4,655,503 | A | * | 4/1987 | Kamijo | B60N 2/203 297/103 |
| 5,052,750 | A | * | 10/1991 | Takahashi | B60N 2/2821 297/256.13 |
| 5,335,965 | A | | 8/1994 | Sedlack et al. | |
| 5,551,751 | A | * | 9/1996 | Sedlack | B60N 2/2821 297/216.11 |

(Continued)

FOREIGN PATENT DOCUMENTS

| CN | 202966019 U | 11/2012 |
| CN | 202896338 U | 4/2013 |

(Continued)

OTHER PUBLICATIONS

Office Action in co-pending Taiwan Patent Application No. 104141577 dated Dec. 7, 2016.

*Primary Examiner* — Joshua J Michener
*Assistant Examiner* — Kyle J. Walraed-Sullivan
(74) *Attorney, Agent, or Firm* — Baker & McKenzie LLP; David I. Roche

(57) ABSTRACT

A child safety seat includes a base having a shell body, a seat shell assembled with the base, the seat shell being adjustable between a plurality of recline positions relative to the base, and a lock mechanism operable to lock the seat shell with the base at any of the recline positions. The lock mechanism includes two latches assembled with the shell body and movable to engage with and disengage from the seat shell, and two release buttons respectively disposed at a left and a right side of the base and respectively coupled with the two latches, each of the two release buttons being independently operable to drive concurrent unlocking displacements of the two latches.

28 Claims, 14 Drawing Sheets

(56) References Cited

U.S. PATENT DOCUMENTS

| | | | |
|---|---|---|---|
| 5,564,778 A | 10/1996 | Shimer et al. | |
| 5,890,762 A * | 4/1999 | Yoshida | B60N 2/2821 297/130 |
| 6,053,573 A * | 4/2000 | Nakagawa | B60N 2/0284 297/237 |
| 6,428,099 B1 * | 8/2002 | Kain | B60N 2/2806 297/250.1 |
| 7,073,859 B1 * | 7/2006 | Wilson | B60N 2/0232 297/250.1 |
| 7,540,507 B1 * | 6/2009 | Kennedy | B60N 2/2821 280/30 |
| 7,828,381 B2 * | 11/2010 | Barger | B60N 2/2875 297/256.13 |
| 8,152,647 B2 * | 4/2012 | Tuckey | A47D 13/105 297/256.12 |
| 2001/0011839 A1 * | 8/2001 | Mori | B60N 2/2821 297/256.13 |
| 2003/0160486 A1 * | 8/2003 | Dukes | B60N 2/2875 297/256.13 |
| 2004/0245822 A1 * | 12/2004 | Balensiefer, II | B60N 2/2806 297/250.1 |
| 2005/0264062 A1 * | 12/2005 | Longenecker | B60N 2/2806 297/250.1 |
| 2006/0261651 A1 * | 11/2006 | Nolan | B60N 2/2806 297/250.1 |
| 2007/0228788 A1 * | 10/2007 | Meeker | B60N 2/2806 297/250.1 |
| 2009/0256406 A1 * | 10/2009 | Schrooten | B60N 2/2821 297/256.16 |
| 2009/0295207 A1 * | 12/2009 | Zink | B60N 2/2824 297/256.13 |
| 2010/0060053 A1 * | 3/2010 | Chen | B60N 2/2821 297/253 |
| 2010/0225150 A1 * | 9/2010 | Duncan | B60N 2/2806 297/256.12 |
| 2011/0025110 A1 * | 2/2011 | Xiao | B60N 2/2821 297/256.16 |
| 2011/0074194 A1 * | 3/2011 | Weber | B60N 2/2821 297/256.13 |
| 2012/0013160 A1 * | 1/2012 | Williams | B60N 2/2821 297/256.16 |
| 2012/0319442 A1 * | 12/2012 | Clement | B60N 2/2821 297/216.11 |
| 2014/0292050 A1 * | 10/2014 | Chen | A47C 4/02 297/256.16 |

FOREIGN PATENT DOCUMENTS

| | | |
|---|---|---|
| CN | 103507671 A | 1/2014 |
| EP | 0853018 B1 | 10/2012 |
| EP | 2716494 A1 | 4/2014 |
| TW | 397331 M | 2/2011 |
| WO | 2007029010 A2 | 3/2007 |

* cited by examiner

CHILD SAFETY SEAT

CROSS-REFERENCE TO RELATED APPLICATION(S)

This application respectively claims priority to U.S. Provisional Patent Application No. 62/124,607 filed on Dec. 23, 2014, and to U.S. Provisional Patent Application No. 62/243,922 filed on Oct. 20, 2015, the disclosures of which are incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., the back supporting the head). Accordingly, safety experts and car seat manufacturers usually recommend to seat children in a vehicle in a rear facing position until the age of 2 years old. As the child grows older, the child safety seat then may be installed in a forward facing position.

Child safety seats available on the market may have a base and a child seat supported thereon. Depending on the size of the child, the child seat may be adjusted relative to the base in order to set a desirable recline angle and provide a comfortable and safe sitting environment for the child. However, the traditional child safety seats generally offer a limited number of recline positions, which cannot desirably adapt to any child's size. Moreover, the release handle used for recline adjustment is usually provided in a central region on a backrest of the child seat or at a center of the base, which may not offer easy access for a caregiver if the child seat were to be adjusted while it rests on a vehicle seat.

Therefore, there is a need for an improved child safety seat that allows convenient recline adjustment, and can address at least the foregoing issues.

SUMMARY

The present application describes a child safety seat that is convenient to operate for recline adjustment, and offer a wide range of recline positions. According to one embodiment, the child safety seat includes a base having a shell body, a seat shell assembled with the base, the seat shell being adjustable between a plurality of recline positions relative to the base, and a lock mechanism operable to lock the seat shell with the base at any of the recline positions. The lock mechanism includes two latches assembled with the shell body and movable to engage with and disengage from the seat shell, and two release buttons respectively disposed at a left and a right side of the base and respectively coupled with the two latches, each of the two release buttons being independently operable to drive concurrent unlocking displacements of the two latches.

According to another embodiment, the child safety seat includes a base having a shell body, a seat shell assembled with the base and adjustable between a plurality of recline positions relative to the base, a linking bar pivotally connected with the shell body about a pivot axis, two latches respectively connected with the linking bar at two opposite sides of the pivot axis, and a release button disposed at one of a left and a right side of the base and coupled with one of the two latches. The two latches are slidable to engage with the seat shell to lock the seat shell at any of the recline positions, and to disengage from the seat shell for allowing adjustment of the seat shell relative to the base. Moreover, the release button is operable to drive concurrent unlocking displacements of the two latches.

DETAILED DESCRIPTION OF THE EMBODIMENTS

Figure 1:
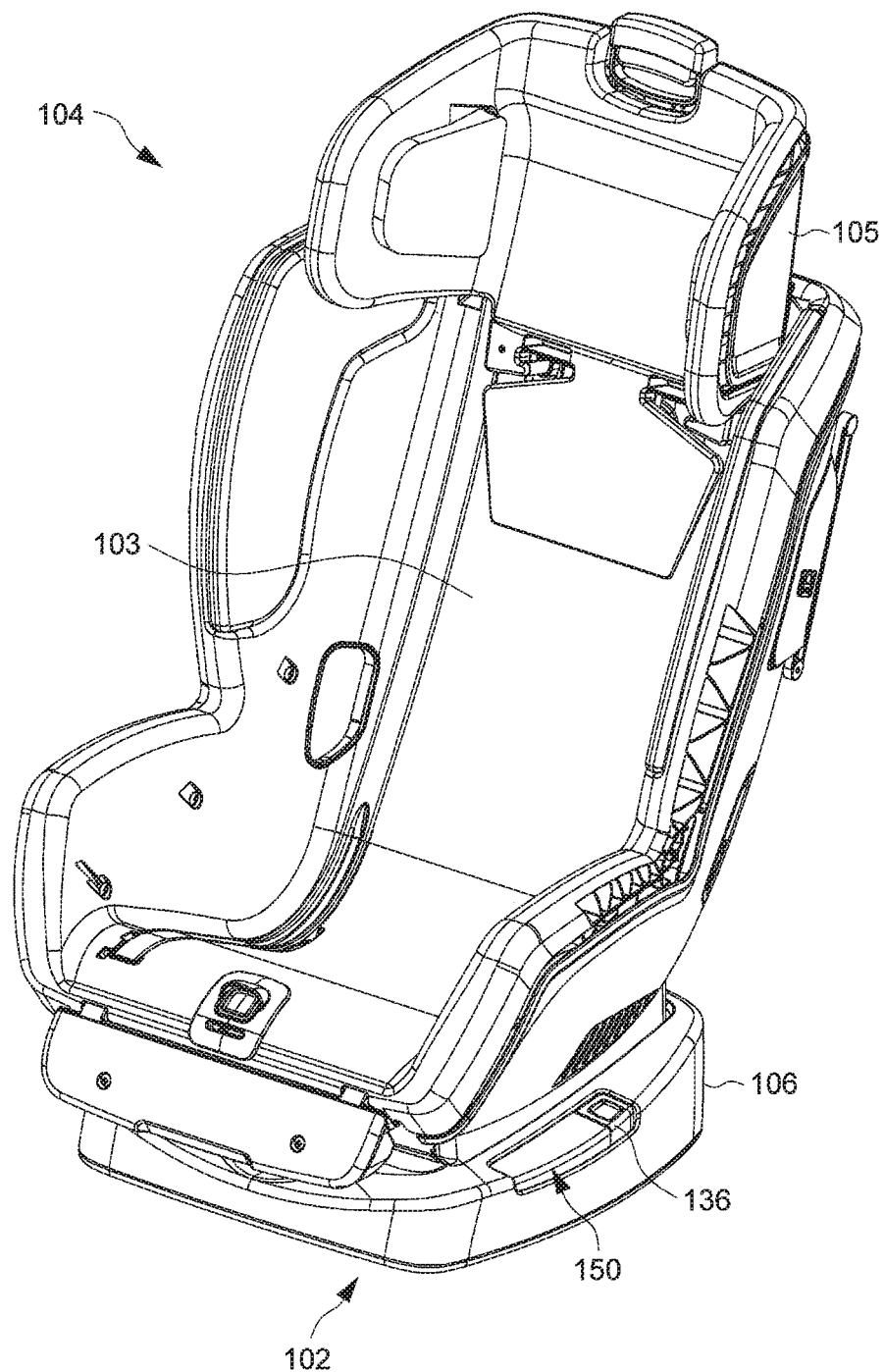
FIG. 1 is a schematic view illustrating an embodiment of a child safety seat.
Figure 2:
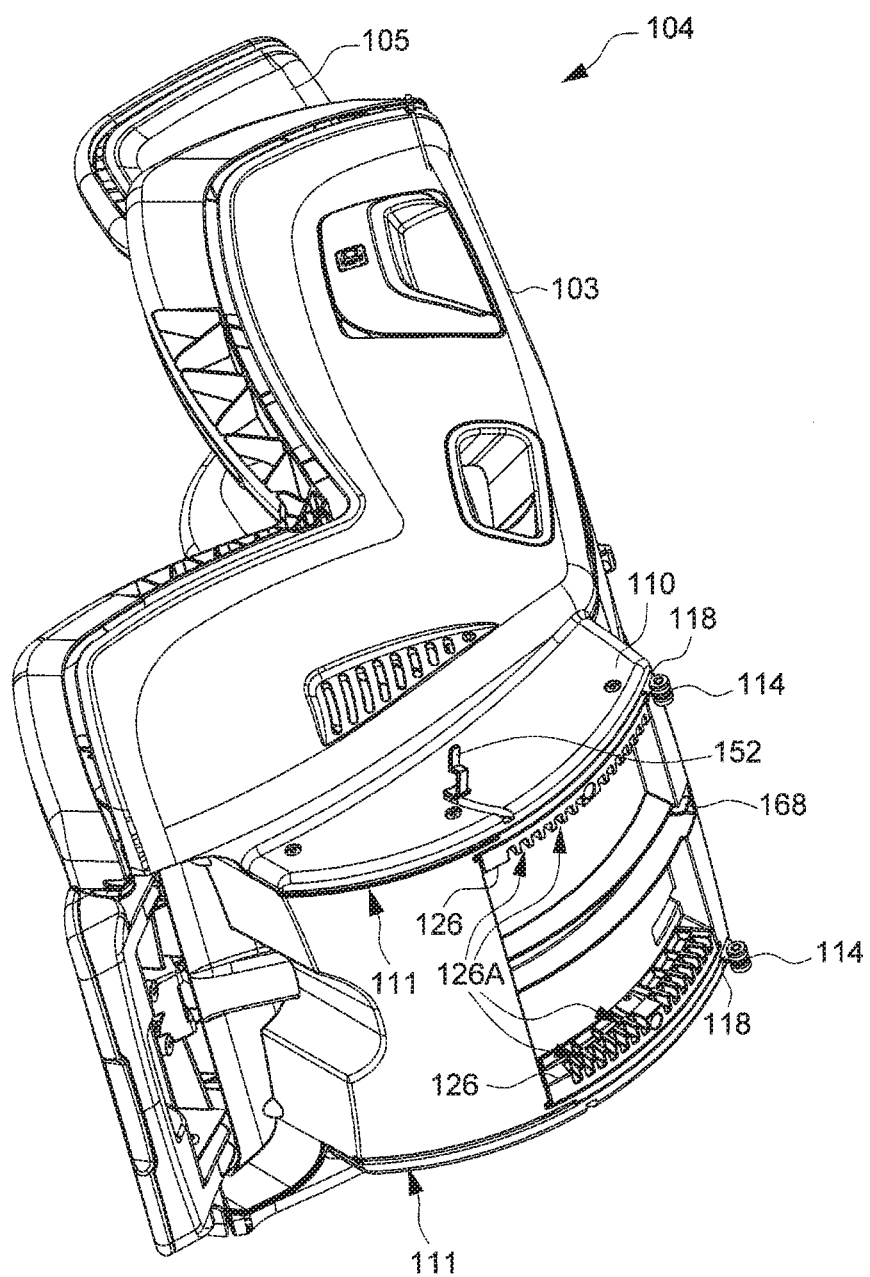
FIG. 2 is a schematic view illustrating a seat shell of the child safety seat shown in FIG. 1.
Figure 3:
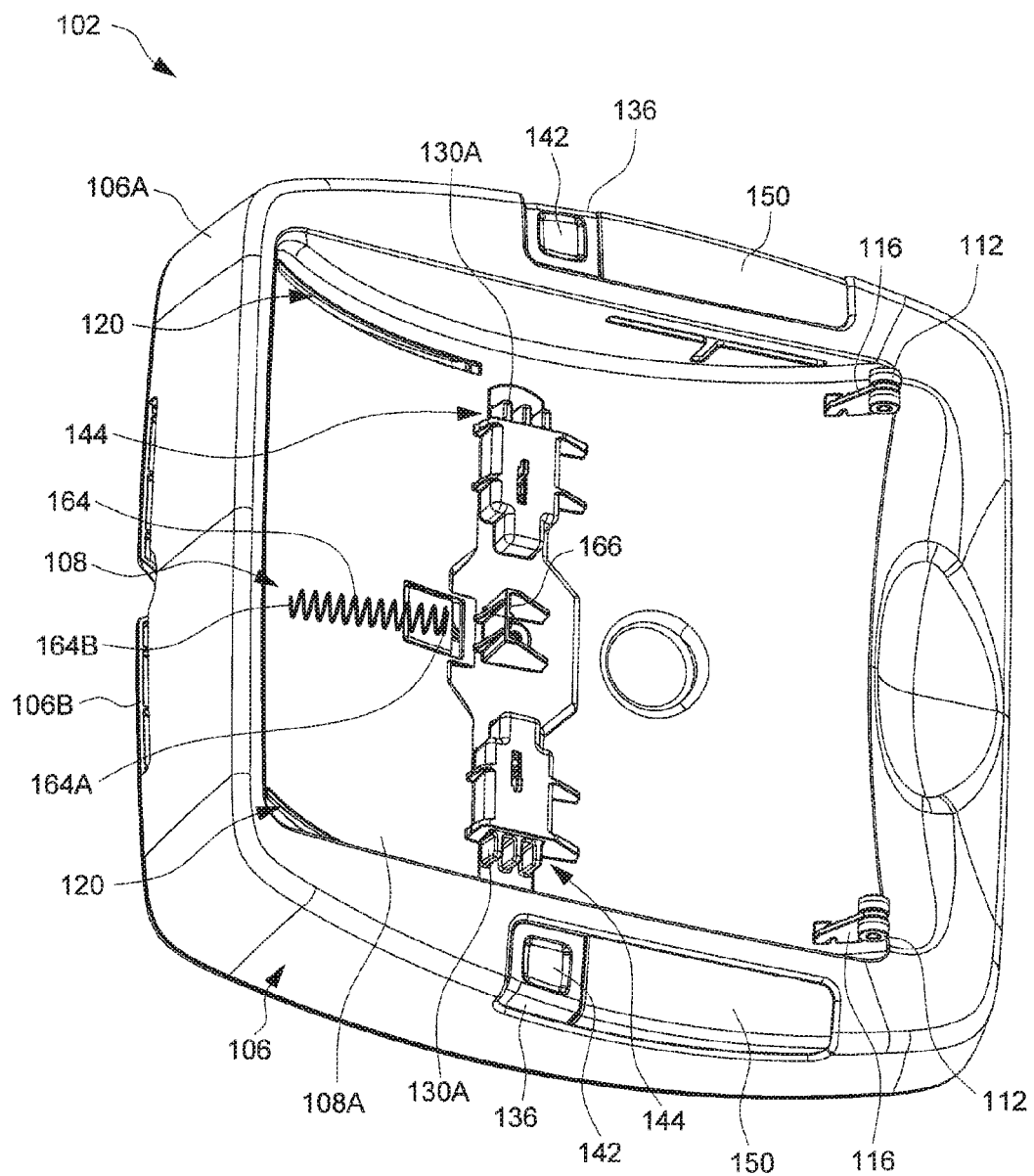
FIG. 3 is a schematic view illustrating a base of the child safety seat shown in FIG. 1.
Figure 4:
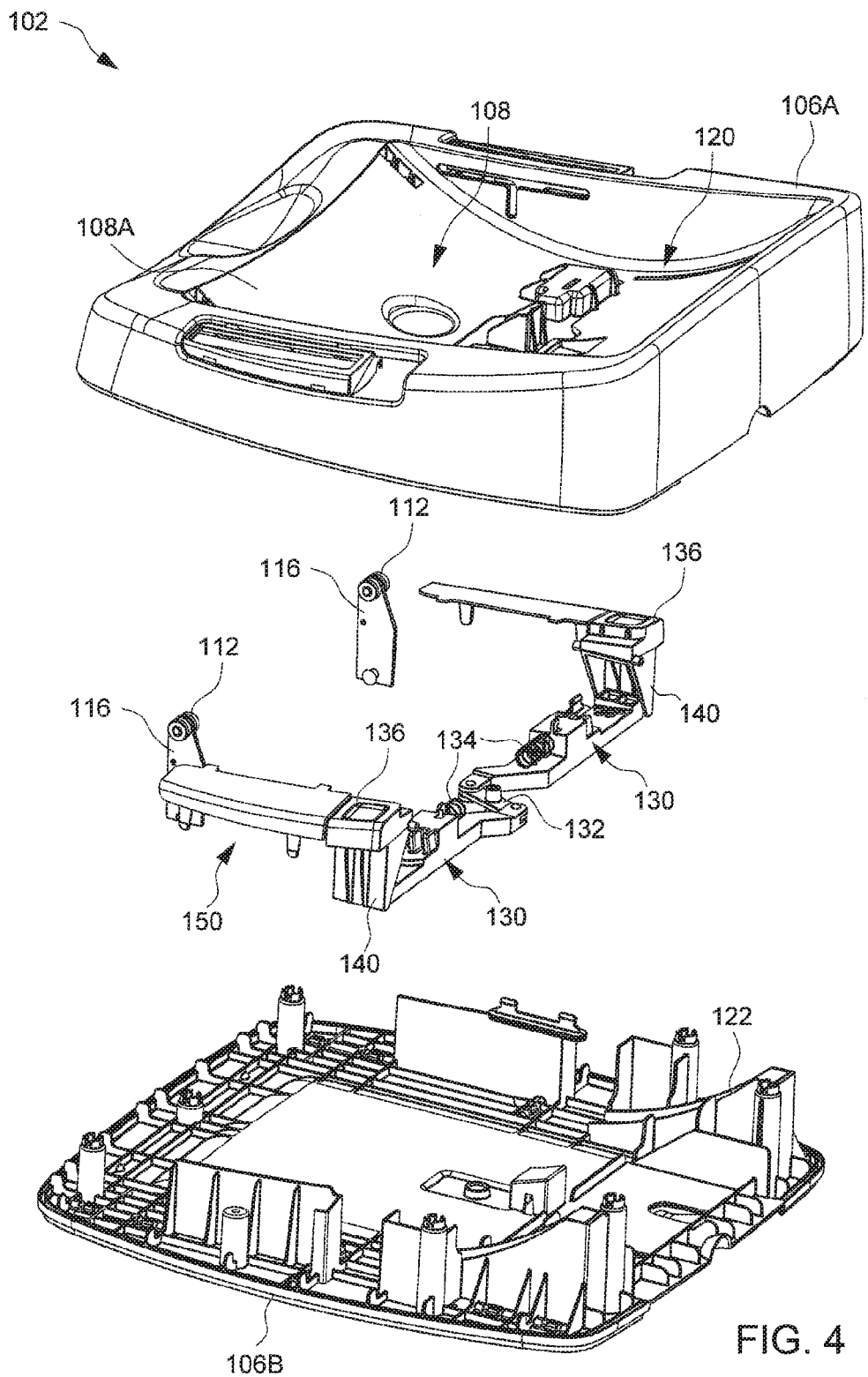
FIG. 4 is an exploded view of the base.

FIG. 1 is a schematic view illustrating an embodiment of a child safety seat 100, FIG. 2 is a schematic view illustrating a seat shell 104 of the child safety seat 100, and FIG. 3 is a schematic view illustrating a base 102 of the child safety seat 100. Referring to FIGS. 1-3, the child safety seat 100 can include a base 102, and a seat shell 104 assembled with the base 102. The seat shell 104 can include a backrest portion 103, and a headrest 105 that may be vertically adjusted along the backrest portion 103 to adapt to a child size. In one embodiment, the seat shell 104 may be permanently assembled with the base 102, and there may be no mechanism allowing a caregiver to remove the seat shell 104 from the base 102. The base 102 can include a shell body 106 having a cavity 108 at an upper side thereof, and the seat shell 104 can be received at least partially in the cavity 108. For example, an underside of the seat shell 104 can have a mount portion 110 protruding downward that can be placed in the cavity 108 of the base 102. For facilitating installation and positioning of the child seat safety seat 100 on a vehicle seat, the seat shell 104 can be slidably adjustable relative to the base 102 between a plurality of recline positions.

Figure 5:
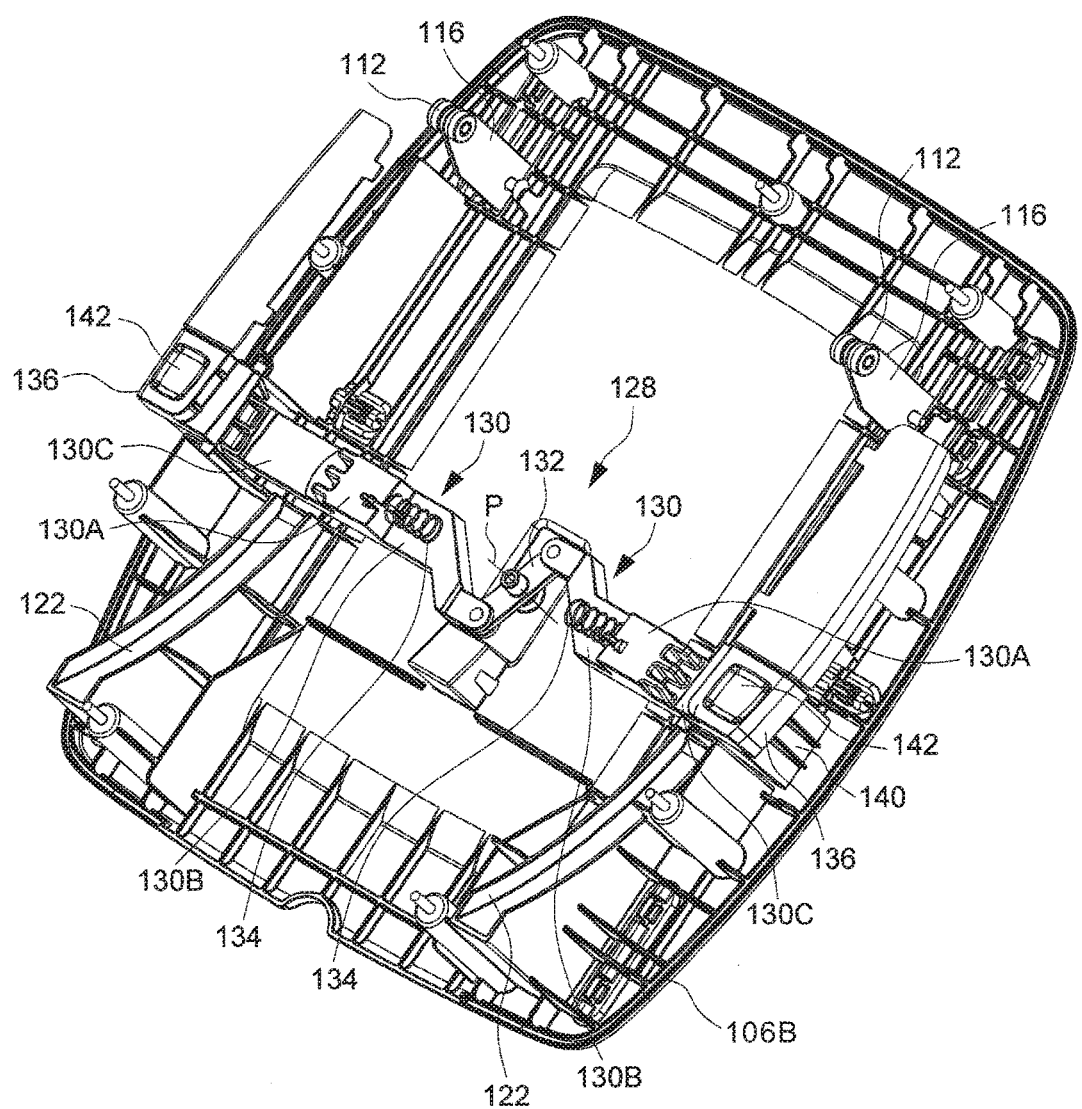
FIG. 5 is a schematic view illustrating an inner construction of the base.

In conjunction with FIGS. 1-3, FIG. 4 is an exploded view of the base 102, and FIG. 5 is a schematic view illustrating an inner construction of the base 102. Referring to FIGS. 1-5, for facilitating sliding movement of the seat shell 104 on the base 102, the base 102 can be assembled with two rollers 112 that are in rolling contact with the seat shell 104, and the seat shell 104 can be assembled with two rollers 114 that are in rolling contact with the base 102. In one embodiment, the shell body 106 of the base 102 can be formed by the assembly of an upper and a lower casing 106A and 106B. The two rollers 112 of the base 102 may be respectively supported pivotally by two brackets 116, which are respectively affixed with the shell body 106 in the cavity 108 adjacent to a left and a right sides thereof. The two rollers 114 of the seat shell 104 may be respectively supported pivotally by two brackets 118 that are affixed with the mount portion 110 respectively near a left and a right side edge thereof. The two brackets 118 can be respectively disposed through two slits 120 formed on a bottom surface 108A of the cavity 108, and the two rollers 114 supported by the brackets 118 can be respectively in rolling contact with two tracks 122 (better shown in FIG. 4 and FIG. 5) affixed to an interior of the shell body 106 (e.g., the lower casing 106B of the shell body 106) below the bottom surface 108A of the cavity 108. Likewise, the two brackets 116 may respectively pass through two slits 111 formed on a bottom surface of the mount portion 110 so as to position the rollers 112 in rolling contact with inner surfaces of the seat shell 104 (not shown). The rolling contact provided by the rollers 112 and 114 can guide and facilitate recline adjustment of the seat shell 104 relative to the base 102.

Referring to FIGS. 1-5, the child safety seat 100 can include a lock mechanism 128 operable to lock the seat shell 104 with the base 102 at any of multiple recline positions. For this purpose, the seat shell 104 can have two rack portions 126 respectively affixed adjacent to two opposite sidewalls provided in a recess area of the mount portion 110. Each of the racks 126 can have a plurality of notches 126A disposed close to one another, which can define a wide range of recline positions with small increments between successive recline positions. Accordingly, the seat shell 104 can be accurately adjusted to any desirable recline angle in accordance with the child's size and age or to adjust for adapting to angle variations of vehicle seating surfaces.

Figure 6:
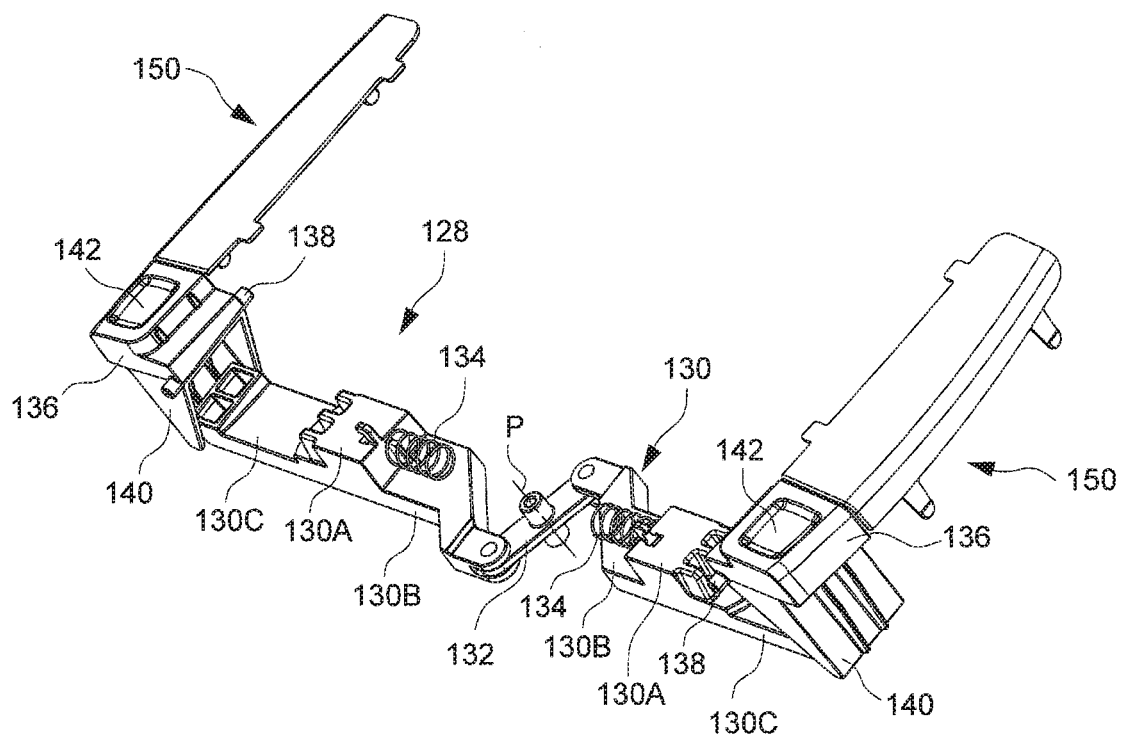
FIG. 6 is a schematic view illustrating component parts of a lock mechanism provided in the base.
Figure 7:
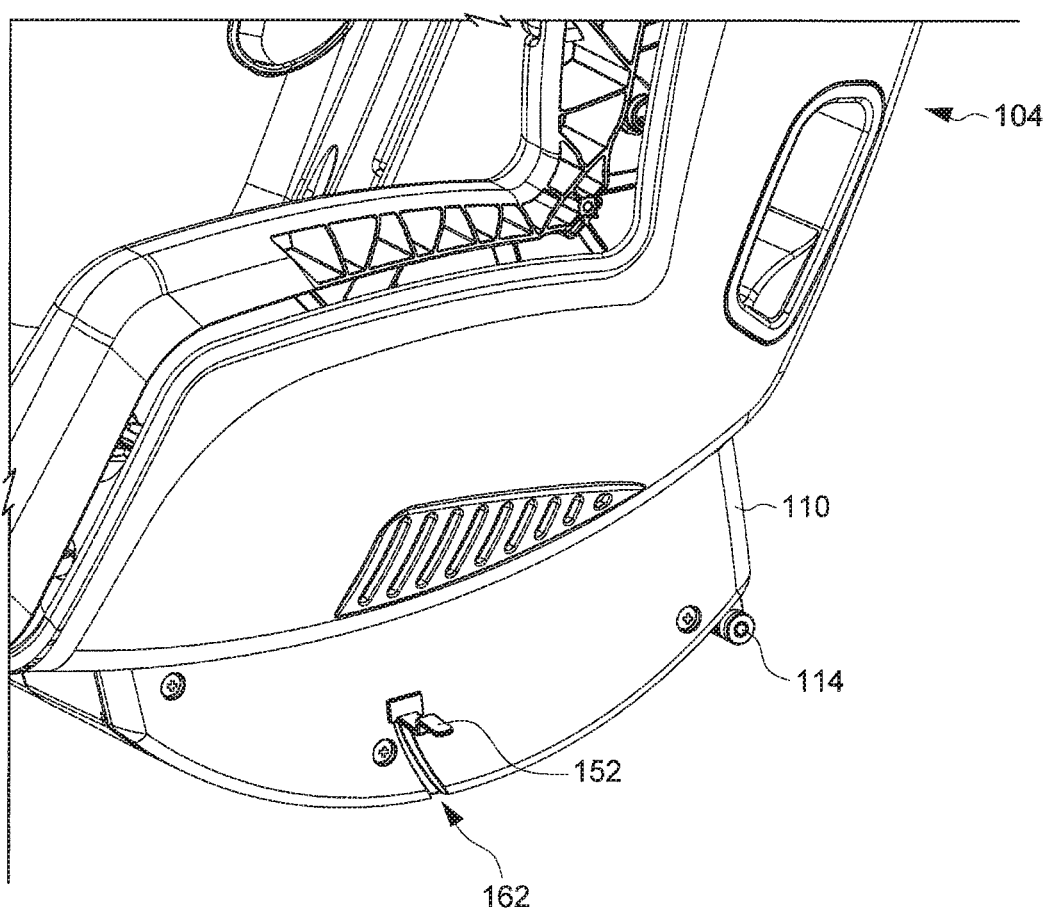
FIG. 7 is an enlarged view illustrating a mount portion of the seat shell having a recline indicator.

In conjunction with FIG. 5, FIG. 6 is a schematic view illustrating some component parts of the lock mechanism 128 provided on the base 102. Referring to FIGS. 5 and 6, the lock mechanism 128 can include two latches 130, a linking bar 132, two springs 134 and two release buttons 136, all of these components being assembled with the base 102. The two latches 130 can be assembled with the shell body 106 for transversal sliding movement in opposite directions. Each latch 130 can be provided as a unitary part having a toothed portion 130A for engaging with one rack portion 126 of the seat shell 104 associated therewith, an arm 130B affixed with the toothed portion 130A and extending at one side thereof, and an extending portion 130C projecting beyond the toothed portion 130A at another side opposite to that of the arm 130B. The toothed portion 130A, the arm 130B and the extending portion 130C may be formed integrally with the latch 130 as one single part, or provided as two or more separate parts that are affixed together to form the latch 130. In one embodiment, the toothed portion 130A of the latch 130 can have a comb shape that can engage with several of the notches 126A of the rack portion 126 at a time. The toothed portions 130A of the two latches 130 can respectively engage with the rack portions 126 to lock the seat shell 104 in position, and disengage from the rack portions 126 to unlock the seat shell 104 and allow its recline adjustment.

The linking bar 132 can be pivotally connected with the shell body 106 about a pivot axis P that extends generally vertically and is located on a central axis of the base 102 extending from a front to a rear. The arms 130B of the two latches 130 can be respectively connected pivotally with the linking bar 132 at two opposite sides of the pivot axis P. This linkage allows the two latches 130 to move relative to the shell body 106 in a concurrent manner for locking and unlocking the seat shell 104. More specifically, the linking bar 132 can rotate in a first direction while the two latches 130 slide transversally toward each other to disengage from the respective rack portions 126 of the seat shell 104, and in a second direction opposite to the first direction while the two latches 130 slide transversally away from each other to engage the respective rack portions 126 of the seat shell 104.

The two springs 134 can be respectively coupled with the two latches 130. For example, each spring 134 can have a first end connected with one latch 130 associated therewith, and a second end connected with the shell body 106. The two springs 134 can respectively bias the two latches 130 transversally away from each other to have the toothed portions 130A respectively engaged with the rack portions 126 for locking the seat shell 104 in any of the recline positions.

The two release buttons 136 can be respectively disposed symmetrically at a left and a right side of the cavity 108, near the left and right side border of the shell body 106. The two release buttons 136 can be respectively coupled with the two latches 130, and each release button 136 can be operated independently to drive concurrent unlocking displacements of the two latches 130 via the connection with the linking bar 132.

In one embodiment, each release button 136 can be pivotally assembled with the shell body 106 of the base 102, and can have a similar construction. For example, the release button 136 can be affixed with a shaft portion 138 that is pivotally supported through a slit provided on the shell body 106 of the base 102. The release button 136 can further have a tongue 140 extending downward from the shaft portion 138, and a button surface 142 above the shaft portion 138. The button surface 142 can be exposed through an opening in the shell body 106 for manual operation by a caregiver. The tongue 140 can be disposed adjacent to the extending portion 130C of one corresponding latch 130, and can be in sliding contact with an end of the extending portion 130C. The shaft portion 138, the tongue 140 and the button surface 142 may be formed integrally with the release button 136 as a single part, or may be provided as separate parts affixed with one another to form the release button 136.

Each of the two release buttons 136 at the left and right sides of the base 102 can be pressed independently to drive an unlocking displacement of the latch 130 associated therewith through a sliding contact between the release button 136 and the extending portion 130C, which in turn causes rotation of the linking bar 132 and drives an unlocking displacement of the other latch 130. Accordingly, the actuation of any one of the two release buttons 136 can cause concurrent unlocking of the two latches 130 for allowing recline adjustment of the seat shell 104.

The latches 130, the linking bar 132 and the springs 134 of the lock mechanism 128 as described herein are assembled in an interior of the shell body 106 below the bottom surface 108A of the cavity 108. The toothed portions 130A of the latches 130 can respectively project outward through openings 144 provided on the bottom surface 108A of the cavity 108 for engaging with the seat shell 104. Moreover, the toothed portion 130A of each latch 130 is located in a region between the pivot axis P and the extending portion 130C thereof, and the extending portion 130C of each latch 130 is located adjacent to the release button 136 associated therewith. For facilitating the construction of the base 102, the two latches 130, the two springs 134 and the two release buttons 136 may be disposed along a same axis extending transversally from the left to the right side of the base 102.

Referring again to FIGS. 1-3, the child safety seat 100 can further include an indicator mechanism that can help a caregiver to accurately identify a current recline position of the seat shell 104 on the base 102. For this purpose, the base 102 can include two display windows 150, and the seat shell 104 can be assembled with two recline indicators 152 movable along the two display windows 150. The two display windows 150 can be disposed symmetrically at a left and a right side of the cavity 108, respectively adjacent to the two release buttons 136. For example, the release button 136 can be adjacent to an end of the display window 150 at each of the left and right side. The display windows 150 can have elongated shapes, and include similar markings associated with predetermined recline positions of the seat shell 104.

Figure 8:
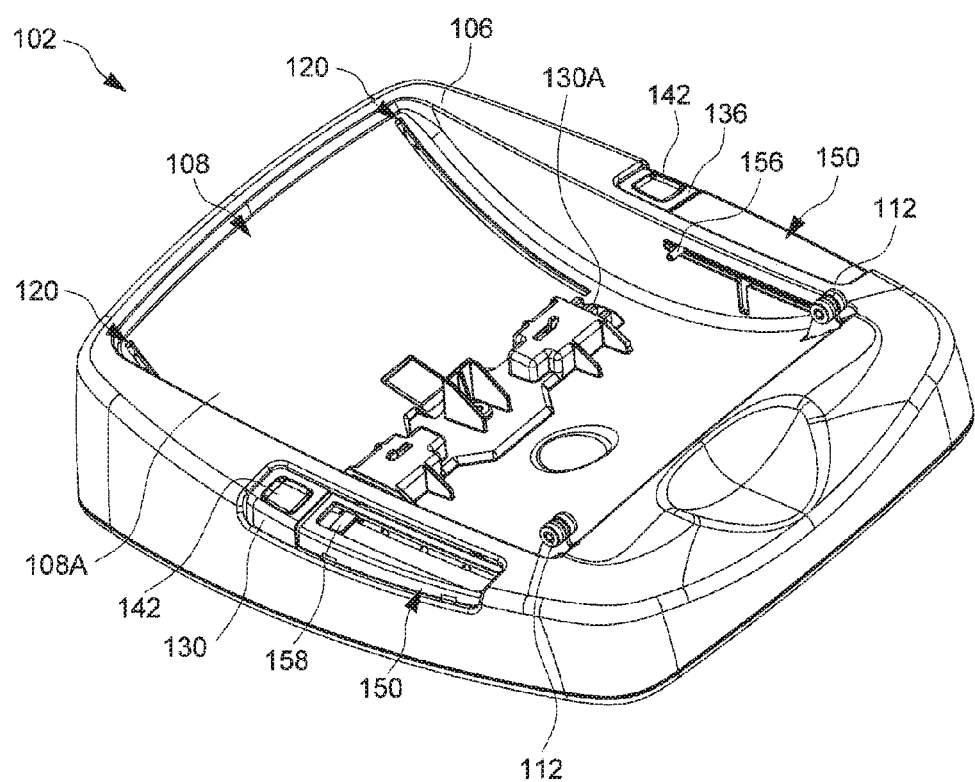
FIGS. 8 and 9 are respectively perspective and cross-sectional views illustrating the assembly of recline indicators with a shell body of the base.
Figure 9:
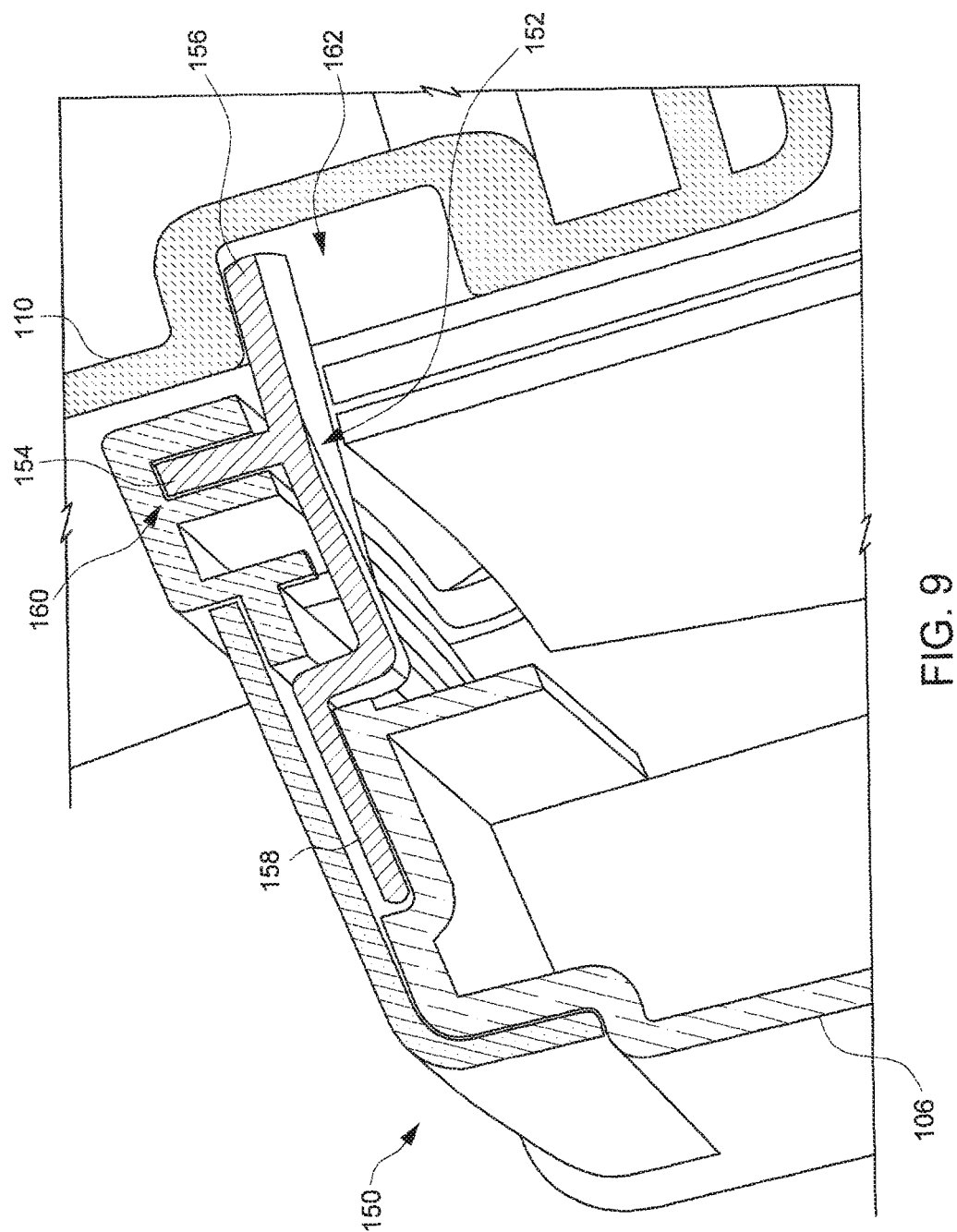
Figure 10:
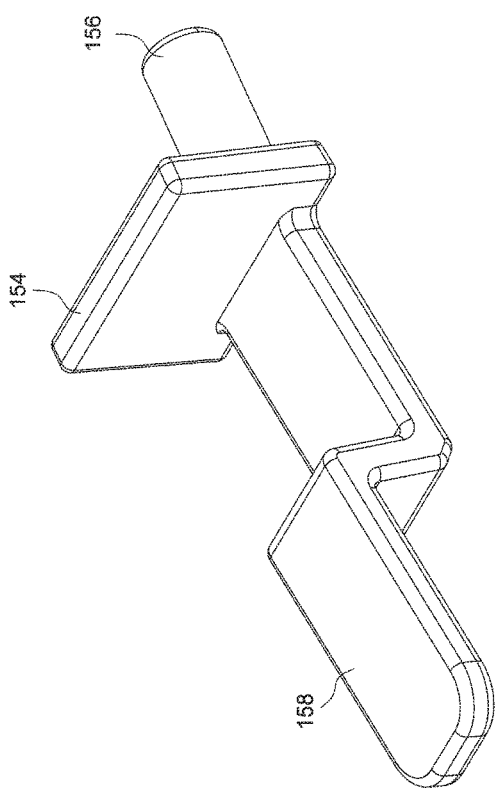
FIG. 10 is a perspective view illustrating one recline indicator alone.

In conjunction with FIGS. 1-3, FIG. 7 is an enlarged view of the mount portion 110 of the seat shell 104, and FIGS. 8 and 9 are respectively perspective and cross-sectional views illustrating the assembly of the recline indicators 152 with the shell body 106 of the base 102, and FIG. 10 is a perspective view illustrating one recline indicator 152 alone. The two recline indicators 152 can have a same construction, and can be respectively assembled at a left and a right side of the mount portion 110. In one embodiment, each recline indicator 152 can be provided as a unitary part having a rib 154, and a pin 156 and a pointing portion 158 respectively projecting at two opposite sides of the rib 154. The rib 154, the pin 156 and the pointing portion 158 may be formed integrally with the recline indicator 152 as one single part, or provided as two or more separate parts that are affixed together to form the recline indicator 152.

The two recline indicators 152 can be respectively assembled in a similar way at the left and right sides of the seat shell 104. More specifically, the pointing portion 158 of each recline indicator 152 can be received in the display window 150 associated therewith. The rib 154 can be guided for sliding displacement along an elongated channel 160 of the shell body 106 that extends generally horizontally along a rear-to-front axis and is parallel to the display window 150. The pin 154 can be positioned in a guide slot 162 provided on a sidewall of the mount portion 110. The guide slot 162 can have a width that is substantially equal to that of the pin 154, and a length (e.g., having a curved profile) along which the pin 154 can be guided for sliding displacements relative to the seat shell 104. The guide slot 162 thus can guide upward and downward sliding movement of the recline indicator 152 relative to the seat shell 104, and couple displacement of the recline indicator 152 with the seat shell 104 along a horizontal direction. Accordingly, the two recline indicators 152 can concurrently slide with the seat shell 104 relative to the base 102 along the two display windows 150 during recline adjustment of the seat shell 104, and the alignment of the pointing portions 158 with markings on the display windows 150 can indicate a corresponding recline position of the seat shell 104.

Figure 11:
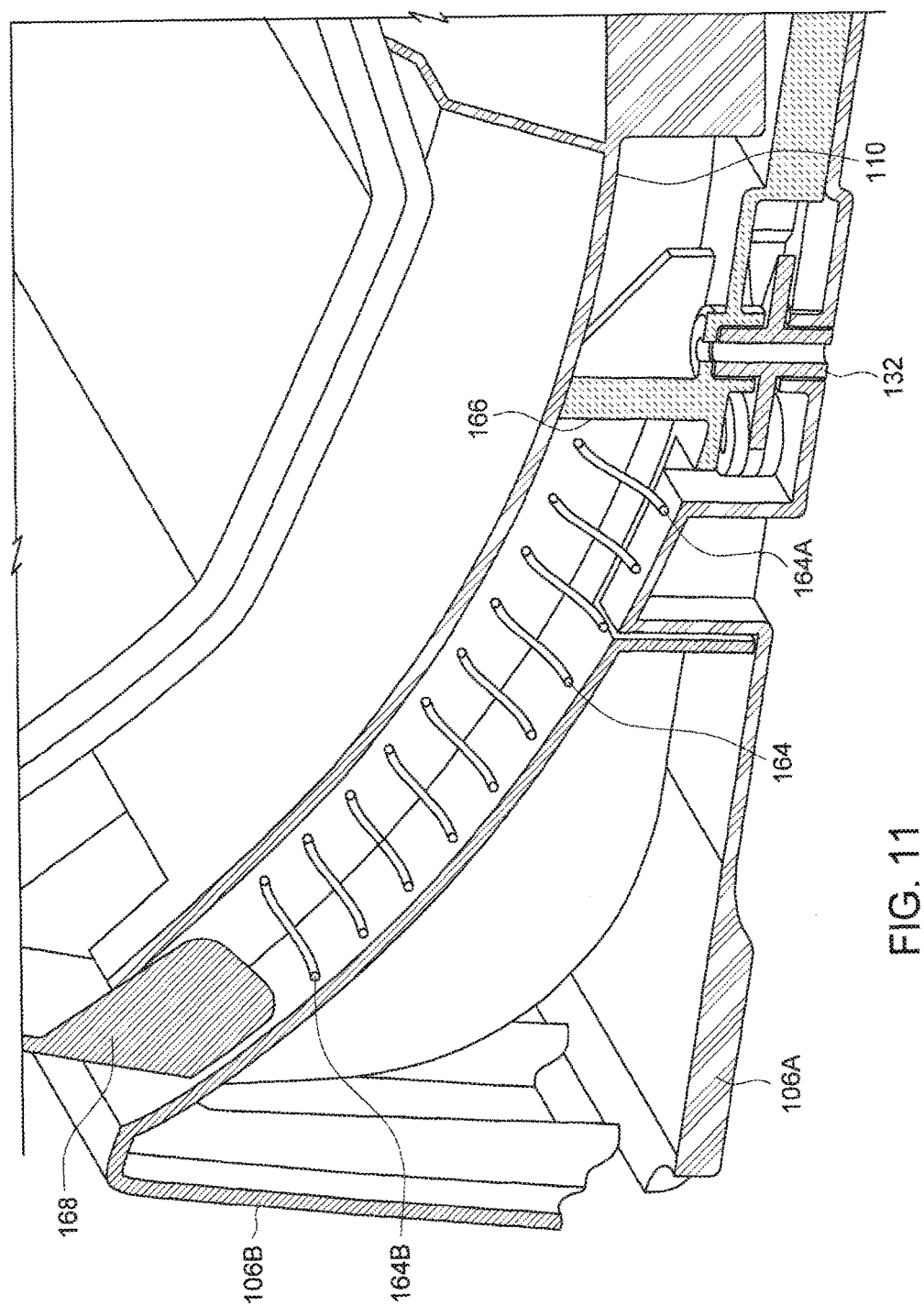
FIG. 11 is a cross-sectional view illustrating the assembly of a spring operable to bias the seat shell toward an upright position.

Referring again to FIG. 3, the child safety seat 100 can further include a spring 164 having two ends 164A and 164B respectively connected with the seat shell 104 and the base 102. In conjunction with FIG. 3, FIG. 11 is a cross-sectional view further illustrating the assembly of the spring 164. The end 164A of the spring 164 can be connected with a fixed tab 166 protruding from the bottom surface 108A of the cavity 108, and the other end 164B of the spring 164 can be connected with a stud 168 affixed with the seat shell 104 at a rear end of the seat shell 104 (better shown in FIGS. 2 and 11). The spring 164 can apply a biasing force on the seat shell 104 that tends to push the seat shell 104 in a direction that increases a distance between the stud 168 and the tab 166. In other words, the biasing force applied by the spring 164 tends to push the rear end of the seat shell 104 rearward (i.e., urge the seat shell 104 from a recline position toward an upright position), and can facilitate adjustment of the seat shell 104 toward an upright position.

Exemplary operation for adjusting a position of the seat shell 104 relative to the base 102 is described hereinafter with reference to FIGS. 1-11. For adjusting the seat shell 104 relative to the base 102, a caregiver can press on the button surface 142 of any one of the two release buttons 136 at the left and right sides of the base 102. As a result, the release button 136 pressed by the caregiver can independently rotate relative to the shell body 106 and cause the tongue 140 to push against the extending portion 130C of the corresponding latch 130, which consequently slides in a direction to compress the spring 134 and disengage the toothed portion 130A from the rack portion 126 of the seat shell 104. The aforementioned sliding movement of the latch 130 drives rotation of the linking bar 132, which in turn drives the other latch 130 to slide in an opposite direction to likewise compress the other spring 134 and disengage the other toothed portion 130A from the other rack portion 126 of the seat shell 104. Accordingly, the actuation of one release button 136 can switch the two latches 130 to an unlocking state in a concurrent manner.

The unlocked seat shell 104 then can be adjusted to a desired position relative to the base 102. During adjustment, the two recline indicators 152 can respectively slide along with the seat shell 104 along the two display windows 150.

Once the seat shell 104 reaches a desired angular position, the two springs 134 can bias the two latches 130 to slide away from each other to engage the two toothed portions 130A with the two rack portions 126 for locking the seat shell 104 in position. The locking displacements of the two latches 130 also respectively push the two release buttons 136 to recover an initial state.

The lock mechanism 128 described herein provides two release buttons 136 respectively at the left and right sides of the base 102, each of which can be independently operated to unlock the seat shell 104. Unlocking and recline adjustment of the seat shell 104 thus can be facilitated regardless whether the child safety seat 100 is installed in a rearward or forward position in a vehicle.

The aforementioned embodiment has provided one exemplary connection between the release buttons 136 and the latches 130. It will be appreciated, however, that different connections may be possible between the release buttons 136 and the latches 130. Other examples of connections between the release buttons 136 and the latches 130 are described hereinafter with reference to FIGS. 12-14.

Figure 12:
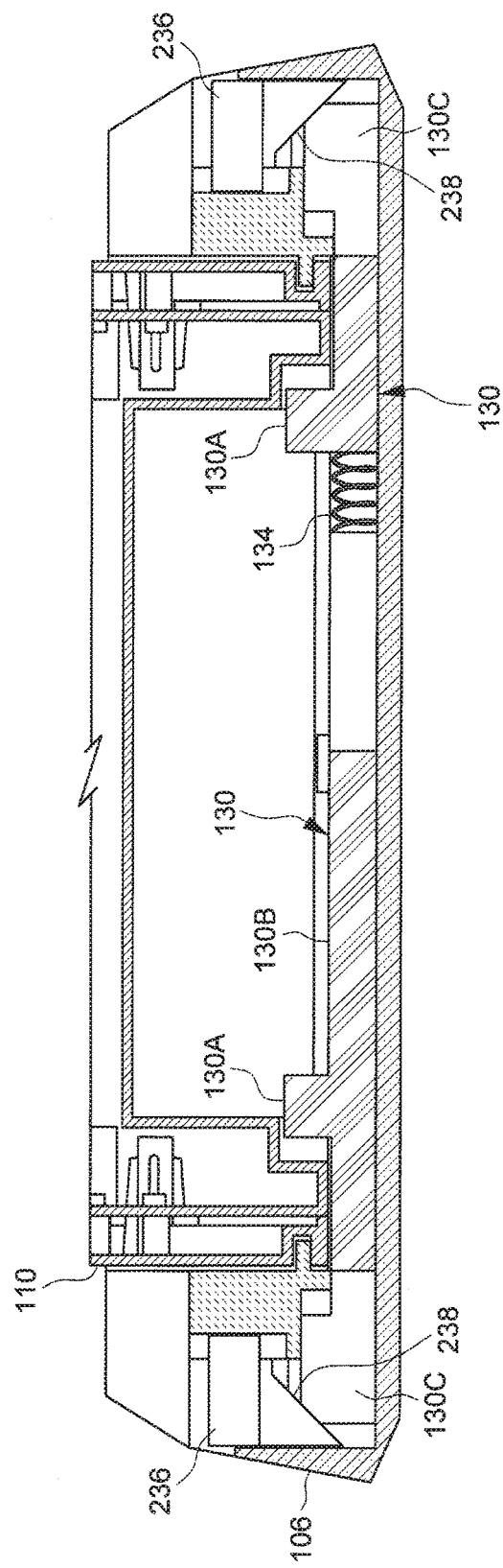
FIGS. 12 through 14 are schematic view illustrating various embodiments for respectively connecting two release buttons with two latches in a child safety seat.

FIG. 12 is a schematic view illustrating a variant embodiment in which the two release buttons 136 described previously are respectively replaced with two release buttons 236 that are slidably assembled with the shell body 106 of the base 102. Each of the two release buttons 236 can slide up and down relative to the shell body 106, and has a ramp surface 238 adjacent to the extending portion 130C of the latch 130 associated therewith. For unlocking the seat shell 104, any of the two release buttons 236 can be independently depressed. Owing to a sliding contact between the ramp surface 238 of the release button 236 and an end of the extending portion 130C, the actuated release button 236 can drive an unlocking displacement of the corresponding latch 130, which in turn can cause the unlocking displacement of the other latch 130 via the coupling of the linking bar 132 like described previously.

Figure 13:
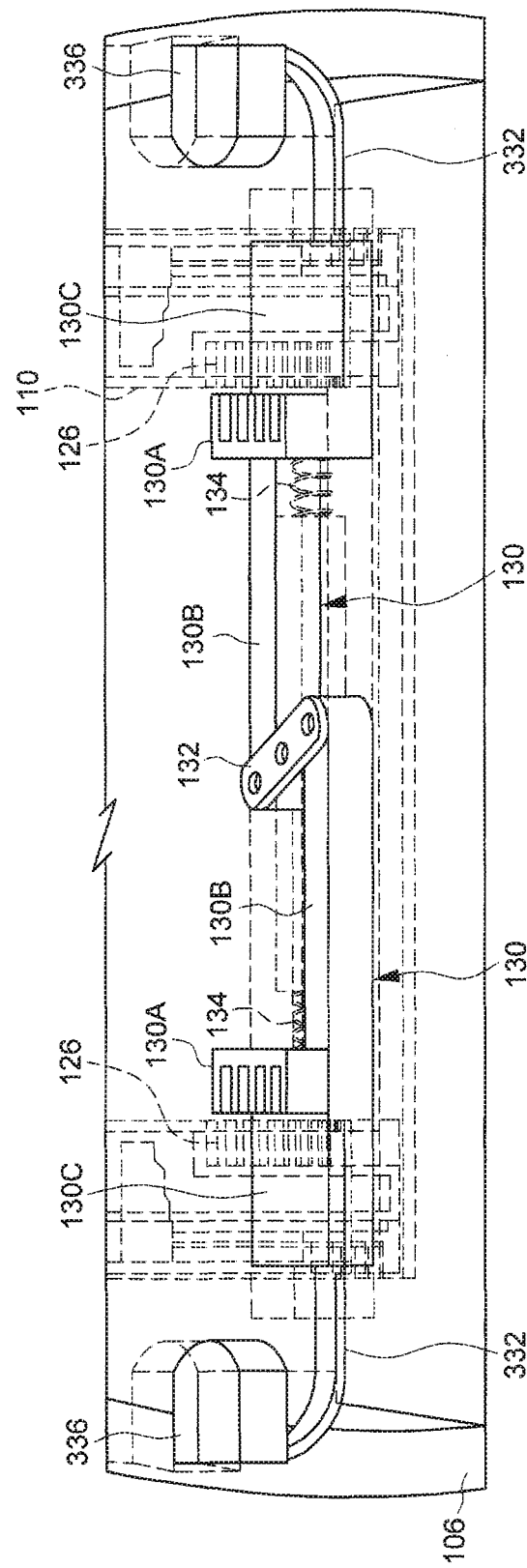

FIG. 13 is a schematic view illustrating another variant embodiment in which the extending portion 130C of each latch 130 respectively includes a resilient strip 332 that is connected with a release button 336 associated therewith. For better illustration, certain portions of the seat shell 104 and the shell body 106 of the base 102 are shown with phantom lines in FIG. 13. The two release buttons 336 are assembled with the shell body 106 for upward and downward sliding movement. Each resilient strip 332 has a curved shape that is capable of elastic deformation, and has a first and a second end respectively connected with the latch 130 and the release button 336. When any of the two release buttons 336 is independently pressed downward, the resilient strip 332 coupled therewith can slide and elastically deform to push the corresponding latch 130 in movement for disengaging from the seat shell 104, which can also drive the unlocking displacement of the other latch 130 via the coupling of the linking bar 132 like described previously.

Figure 14:
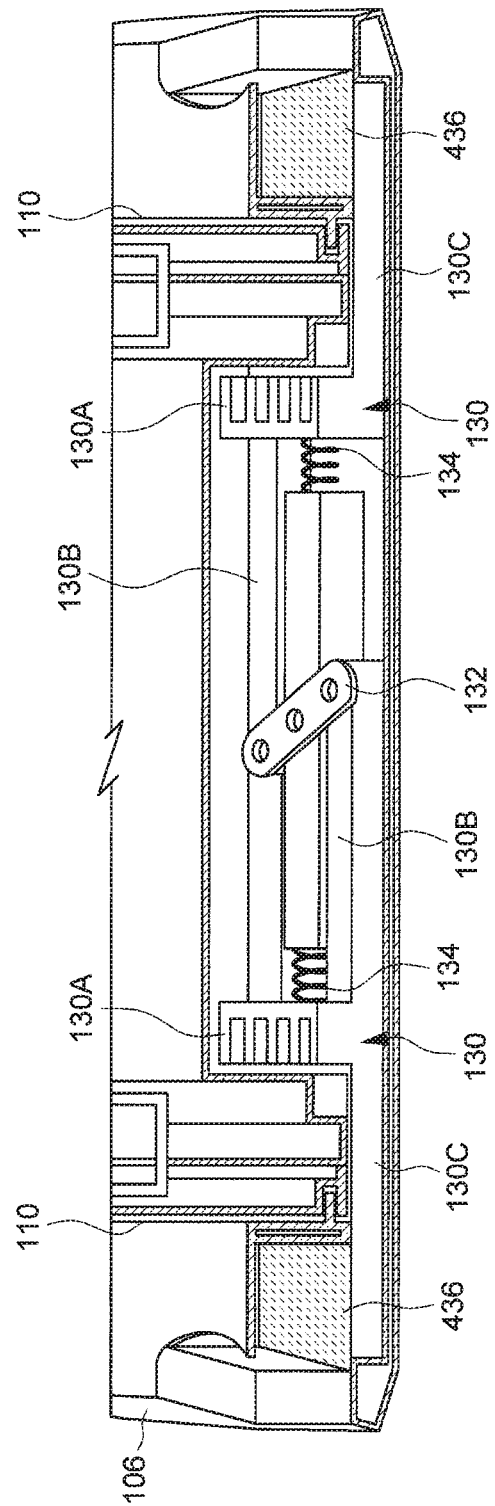

FIG. 14 is a schematic view illustrating another embodiment in which the two latches 130 are respectively affixed with two release buttons 436 provided at the left and right side of the base 102, e.g., each release button 436 can be affixed with the extending portion 130C of the latch 130 coupled therewith. The two release buttons 436 are assembled with the shell body 106 of the base 102 for transversal sliding movement, and can respectively slide in unison with the latches 130 coupled therewith. When any of the two release buttons 436 is independently pressed, the latch 130 affixed therewith can slide in the same direction for disengaging from the seat shell 104, which can also drive the unlocking displacement of the other latch 130 via the coupling of the linking bar 132 like described previously.

Advantages of the child safety seats described herein includes the ability to provide easy operation for unlocking and adjusting a seat shell relative to a base. Moreover, the child safety seat can offer a wide range of recline positions with small increments between successive recline positions, so that the child safety seat can be accurately adjusted to any desirable recline angle in accordance with the child's size.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a base having a shell body;
   a seat shell assembled with the base, the seat shell being movable on the base for adjustment between a plurality of recline positions relative to the base; and
   a lock mechanism operable to lock the seat shell with the base at any of the recline positions, wherein the lock mechanism includes two latches assembled with the shell body and movable to engage with and disengage from the seat shell, a linking bar and two release buttons, the linking bar being pivotally assembled with the shell body about a pivot axis, the two latches being respectively connected with the linking bar at two opposite sides of the pivot axis, and the two release buttons being respectively disposed at a left and a right side of the base and respectively coupled with the two latches, each of the two release buttons being independently operable to drive concurrent unlocking displacements of the two latches for disengaging the two latches from the seat shell, wherein at least a first one of the two latches has an extending portion located adjacent to a first one of the two release buttons, and a toothed portion located in a region between the pivot axis and the extending portion, the first latch being movable to engage the toothed portion with the seat shell and to disengage the toothed portion from the seat shell.

2. The child safety seat according to claim 1, wherein the two release buttons and the two latches are disposed along an axis extending transversally from the left to the right side of the base.

3. The child safety seat according to claim 1, wherein the two latches are respectively connected pivotally with the linking bar.

4. The child safety seat according to claim 1, wherein the first release button drives an unlocking displacement of the first latch through a sliding contact between the first release button and the extending portion.

5. The child safety seat according to claim 1, wherein the extending portion includes a resilient strip capable of elastic deformation respectively connected with the first latch and the first release button.

6. The child safety seat according to claim 1, wherein the two release buttons are pivotally assembled with the shell body of the base.

7. The child safety seat according to claim 1, wherein the two release buttons are slidably assembled with the shell body of the base.

8. The child safety seat according to claim 1, wherein the two release buttons are respectively affixed with the two latches, and are slidably assembled with the shell body of the base.

9. The child safety seat according to claim 1, wherein the two latches are spring biased to engage with the seat shell for locking the seat shell in any of the recline positions.

10. The child safety seat according to claim 1, wherein the two latches are slidable in transversally opposite directions relative to the shell body of the base, the two latches sliding toward each other to disengage from the seat shell, and the two latches sliding away from each other to engage with the seat shell.

11. The child safety seat according to claim 1, wherein the base further includes two display windows respectively disposed adjacent to the two release buttons, and the seat shell is assembled with two recline indicators, the two recline indicators being respectively movable along the two display windows while the seat shell is adjusted relative to the base.

12. The child safety seat according to claim 11, wherein the seat shell includes a guide slot for guiding upward and downward sliding movements of one of the two recline indicators relative to the seat shell.

13. The child safety seat according to claim 11, wherein the shell body of the base has a cavity in which the seat sell is at least partially received, and the two release buttons and the two display windows are disposed symmetrically at a left and a right side of the cavity.

14. The child safety seat according to claim 1, wherein the base is assembled with a plurality of first rollers that are in rolling contact with the seat shell, and the seat shell is assembled with a plurality of second rollers that are in rolling contact with the base.

15. The child safety seat according to claim 1, further including a spring respectively connected with the base and the seat shell, the spring applying a biasing force for urging the seat shell from a recline position toward an upright position.

16. A child safety seat comprising:
a base having a shell body;
a seat shell assembled with the base, the seat shell being movable on the base for adjustment between a plurality of recline positions relative to the base;
a linking bar pivotally connected with the shell body about a pivot axis;
two latches respectively connected with the linking bar at two opposite sides of the pivot axis, wherein the two latches are slidable to engage with the seat shell to lock the seat shell at any of the recline positions, and to disengage from the seat shell for recline adjustment of the seat shell relative to the base; and
a release button disposed at one of a left and a right side of the base and coupled with one of the two latches, the release button being operable to drive concurrent unlocking displacements of the two latches for disengaging the two latches from the seat shell, wherein at least a first one of the two latches has an extending portion located adjacent to the release button, and a toothed portion located in a region between the pivot axis and the extending portion, the first latch being movable to engage the toothed portion with the seat shell and to disengage the toothed portion from the seat shell.

17. The child safety seat according to claim 16, wherein the two latches are respectively connected pivotally with the linking bar.

18. The child safety seat according to claim 16, wherein the release button drives an unlocking displacement of the first latch through a sliding contact between the release button and the extending portion.

19. The child safety seat according to claim 16, wherein the extending portion includes a resilient strip capable of elastic deformation respectively connected with the first latch and the release button.

20. The child safety seat according to claim 16, wherein the release button is pivotally assembled with the shell body of the base.

21. The child safety seat according to claim 16, wherein the release button is slidably assembled with the shell body of the base.

22. The child safety seat according to claim 16, wherein the release button is affixed with one of the two latches, and is slidably assembled with the shell body of the base.

23. The child safety seat according to claim 16, wherein the two latches are spring biased to engage with the seat shell for locking the seat shell in any of the recline positions.

24. The child safety seat according to claim 16, wherein the two latches are slidable in transversally opposite directions relative to the shell body of the base, the two latches sliding toward each other to disengage from the seat shell, and the two latches sliding away from each other to engage with the seat shell.

25. The child safety seat according to claim 16, wherein the base further includes a display window disposed adjacent to the release button, and the seat shell is assembled with a recline indicator, the recline indicator being movable along the display window while the seat shell is adjusted relative to the base.

26. The child safety seat according to claim 25, wherein the seat shell has a guide slot for guiding upward and downward sliding movements of the recline indicator relative to the seat shell.

27. The child safety seat according to claim 16, wherein the base is assembled with a plurality of first rollers that are in rolling contact with the seat shell, and the seat shell is assembled with a plurality of second rollers that are in rolling contact with the base.

28. The child safety seat according to claim 16, further including a spring respectively connected with the base and the seat shell, the spring applying a biasing force for urging the seat shell from a recline position toward an upright position.

* * * * *